US009216499B2

(12) United States Patent
Huang

(10) Patent No.: US 9,216,499 B2
(45) Date of Patent: Dec. 22, 2015

(54) PULLER STRUCTURE

(71) Applicant: PULLER STRUCTURE, Taichung (TW)

(72) Inventor: Chia-Hao Huang, Taichung (TW)

(73) Assignee: POUL CHANG METAL INDUSTRY CO., LTD., Taichung (TW)

( * ) Notice: Subject to any disclaimer, the term of this patent is extended or adjusted under 35 U.S.C. 154(b) by 117 days.

(21) Appl. No.: 14/195,724

(22) Filed: Mar. 3, 2014

(65) Prior Publication Data

US 2015/0246436 A1 Sep. 3, 2015

(51) Int. Cl.
*B23P 19/04* (2006.01)
*B25B 27/02* (2006.01)

(52) U.S. Cl.
CPC .................................. *B25B 27/023* (2013.01)

(58) Field of Classification Search
USPC ........................... 29/244, 256, 259, 261, 262
See application file for complete search history.

(56) References Cited

U.S. PATENT DOCUMENTS 2,613,983 A * 10/1952 Knudsen ................. B25B 27/06 29/262
5,896,639 A * 4/1999 Chen ..................... B25B 27/026 29/261
6,895,646 B1 * 5/2005 Houg .................... B25B 27/026 29/252
7,216,409 B1 * 5/2007 Chiu ..................... B25B 27/023 29/255

* cited by examiner

*Primary Examiner* — Lee D Wilson
*Assistant Examiner* — Shantese McDonald

(57) ABSTRACT

A pulling structure contains: a holding disc, an adjusting member, a screw rod set, and pulling hooks. The holding disc includes a threaded orifice for inserting the screw rod set, the threaded orifice has a wide screwing section and a narrow screwing section, the holding disc also includes plural connecting portions for connecting with the pulling hooks. The screw rod set includes an inner screw rod, an outer screw rod, and a hollow screw sleeve, and the outer screw is screwed with the wide screwing section, and the screw sleeve is screwed with the outer screw rod. The adjusting member is fitted in the outer screw rod and is defined between the screw sleeve and the holding disc, and a spring element abuts against the adjusting member and the holding disc. The adjusting member includes a plurality of coupling posts, and each pulling hook has an inclined guiding face.

5 Claims, 9 Drawing Sheets

PULLER STRUCTURE

FIELD OF THE INVENTION

The present invention relates to a puller structure in which a distance between an adjusting member and a holding disc is adjusted so as to control a plurality of pulling hooks to expand outwardly or retract inwardly, such that before removing an object, the plurality of pulling hooks are aligned with the object accurately so as to remove the object quickly.

BACKGROUND OF THE INVENTION

A conventional puller contains an operating portion and a plurality of hooking claws away from the operating portion. The operating portion has an abutting post extending outwardly therefrom, and each hooking claw is adjusted to expand outwardly or retract inwardly, the operating portion is provided to adjust the abutting post.

In operation, user operates the operating portion to drive the abutting post, and then the abutting post expands outwardly, thereafter an adjustable screw nut is rotated to adjust a clamping position of the plurality of hooking claws and a driving wheel, and the user has to observe whether the plurality of hooking claws clamp the driving wheel. However, such an operation is troublesome. Also, the clamping position of the plurality of hooking claws and the driving wheel cannot be adjusted exactly, thereby damaging the driving wheel easily.

The present invention has arisen to mitigate and/or obviate the afore-described disadvantages.

SUMMARY OF THE INVENTION

The primary objective of the present invention is to provide a puller structure in which a distance between an adjusting member and a holding disc is adjusted so as to control a plurality of pulling hooks to expand outwardly or retract inwardly, such that before removing an object, the plurality of pulling hooks are aligned with the object accurately so as to remove the object quickly.

To obtain the above objective, a puller structure provided by the present invention contains: a holding disc, an adjusting member, a screw rod set, and a plurality of pulling hooks.

The holding disc includes a threaded orifice defined on a central position thereof so as to insert the screw rod set, and the threaded orifice has a wide screwing section formed around an upper side thereof and a narrow screwing section arranged around a lower side thereof, the holding disc also includes plural connecting portions disposed on a peripheral side thereof so as to connect with the plurality of pulling hooks.

The screw rod set includes an inner screw rod, an outer screw rod, and a hollow screw sleeve, wherein the inner screw rod is solid and is inserted through the narrow screwing section of the threaded orifice, and the outer screw rod is hollow and is fitted with an outer peripheral side of the inner screw rod, a bottom end of the outer screw is screwed with the wide screwing section, and the screw sleeve is screwed with the outer peripheral side of the outer screw rod.

The adjusting member is fitted in the outer screw rod and is defined between the screw sleeve and the holding disc, and a spring element abuts against the adjusting member and the holding disc. The adjusting member includes a plurality of coupling posts mounted on a peripheral side thereof, and each pulling hook has an inclined guiding face defined on a top end thereof so as to fit each coupling post.

DETAILED DESCRIPTION OF THE PREFERRED EMBODIMENTS

Figure 1:
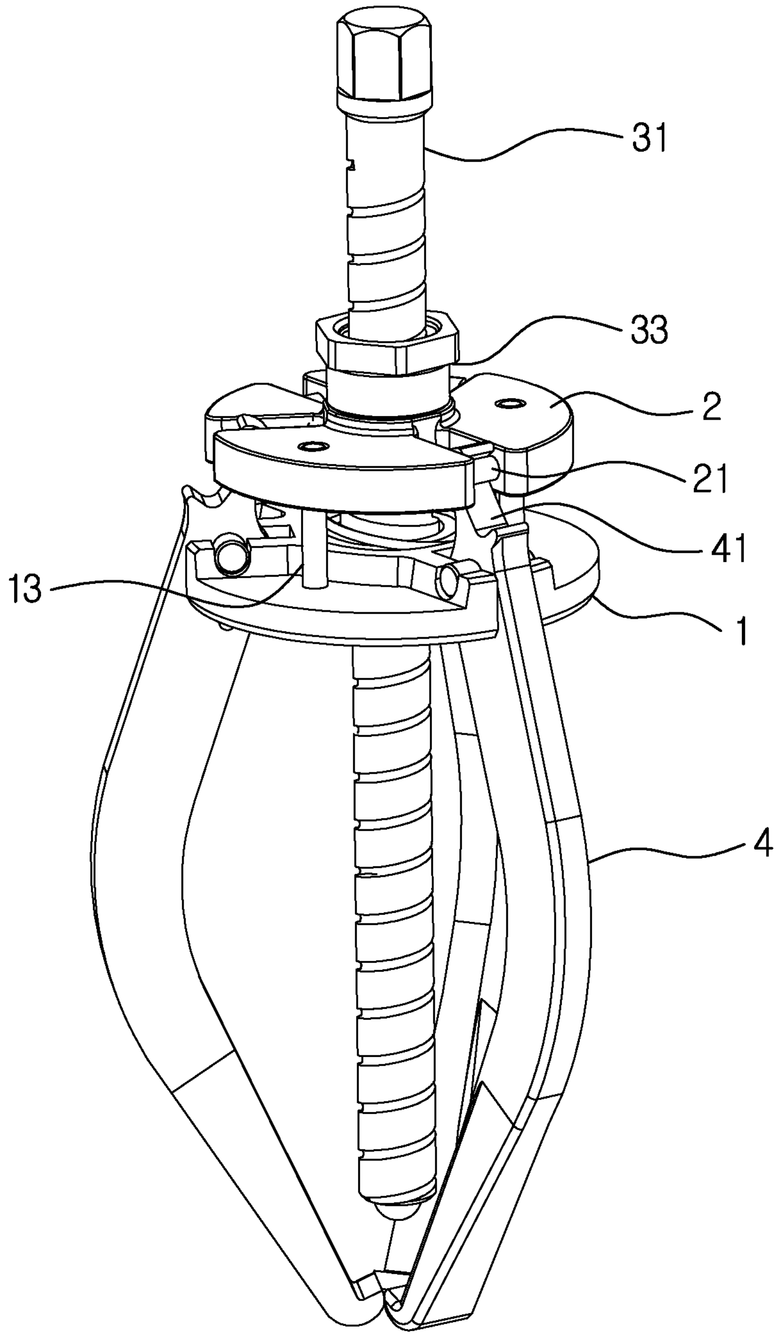
FIG. 1 is a perspective view showing the assembly of a puller structure according to a first embodiment of the present invention.

With reference to FIGS. 2-7, a puller structure according to a second embodiment of the present invention comprises: a holding disc 1, an adjusting member 2, a screw rod set 3, and a plurality of pulling hooks 4.

The holding disc 1 includes a threaded orifice 11 defined on a central position thereof so as to insert the screw rod set 3, and the threaded orifice 11 has a wide screwing section 111 formed around an upper side thereof and a narrow screwing section 112 arranged around a lower side thereof, the holding disc 1 also includes plural connecting portions 12 disposed on a peripheral side thereof so as to connect with the plurality of pulling hooks 4.

The screw rod set 3 includes an inner screw rod 31, an outer screw rod 32, and a hollow screw sleeve 33, wherein the inner screw rod 31 is solid and is inserted through the narrow screwing section 112 of the threaded orifice 11, and the outer screw rod 32 is hollow and is fitted with an outer peripheral side of the inner screw rod 31, a bottom end of the outer screw 32 is screwed with the wide screwing section 111, and the screw sleeve 33 is screwed with the outer peripheral side of the outer screw rod 32.

The adjusting member 2 is fitted in the outer screw rod 32 and is defined between the screw sleeve 33 and the holding disc 1, and a spring element 5 abuts against the adjusting member 2 and the holding disc 1. The adjusting member 2 includes a plurality of coupling posts 21 mounted on a peripheral side thereof, and each pulling hook 4 has an inclined guiding face 41 defined on a top end thereof so as to fit each coupling post 21, the inclined guiding face 41 has two stopping ribs arranged on a top end and a bottom end thereof.

Figure 5:
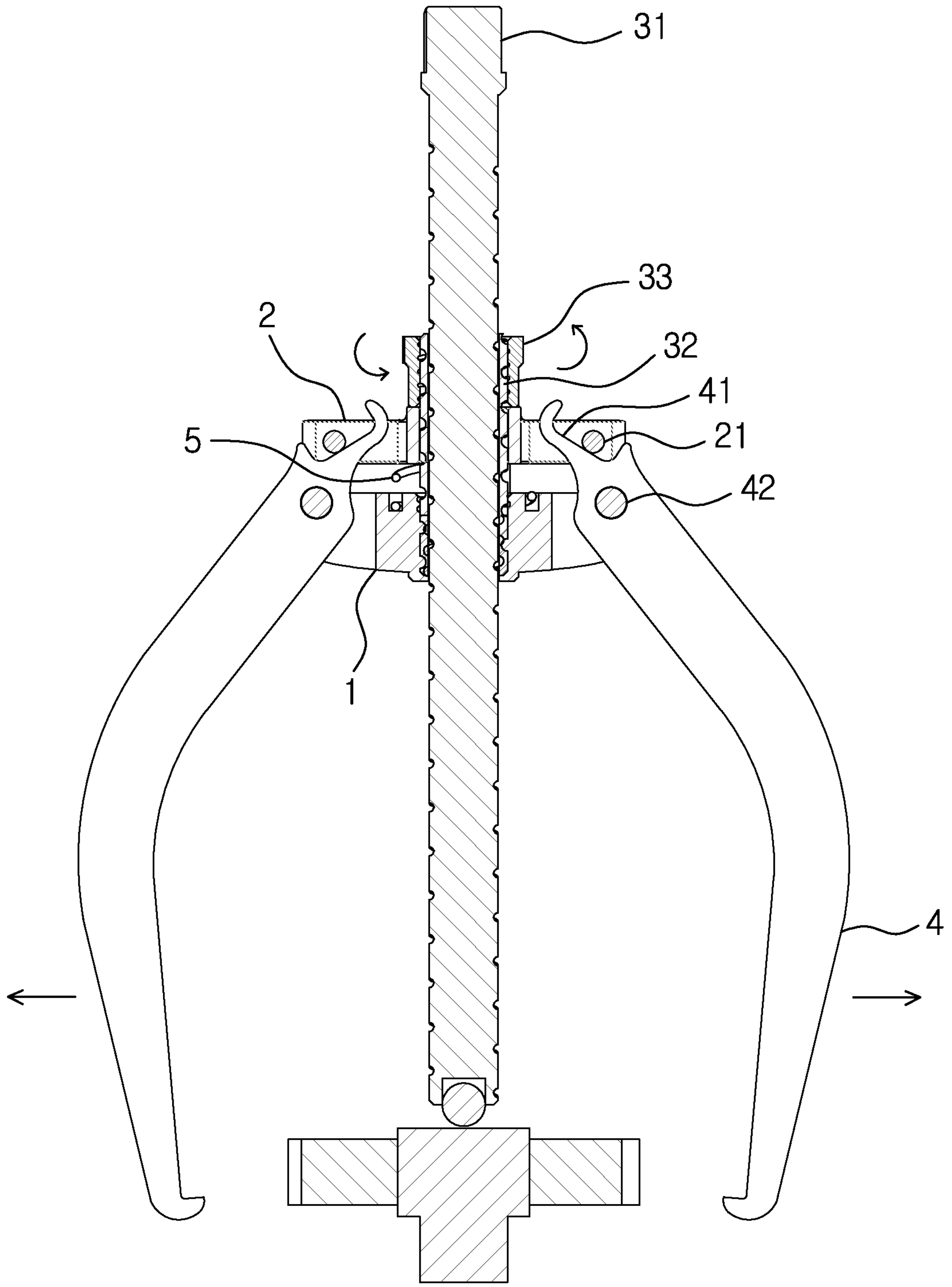
FIG. 5 is a cross sectional view showing the operation of the puller structure according to the second embodiment of the present invention.
Figure 6:
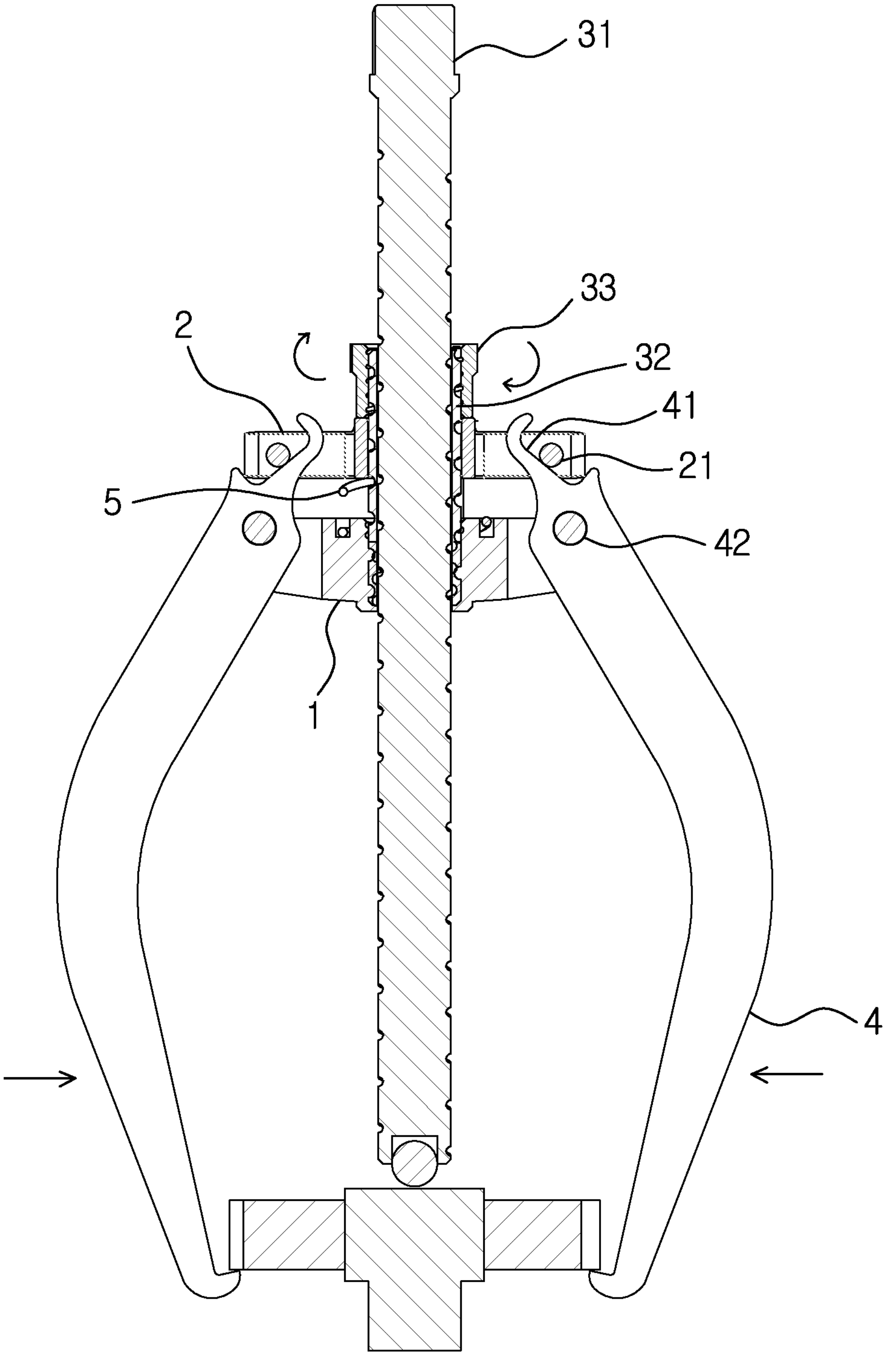
FIG. 6 is another cross sectional view showing the operation of the puller structure according to the second embodiment of the present invention.
Figure 7:
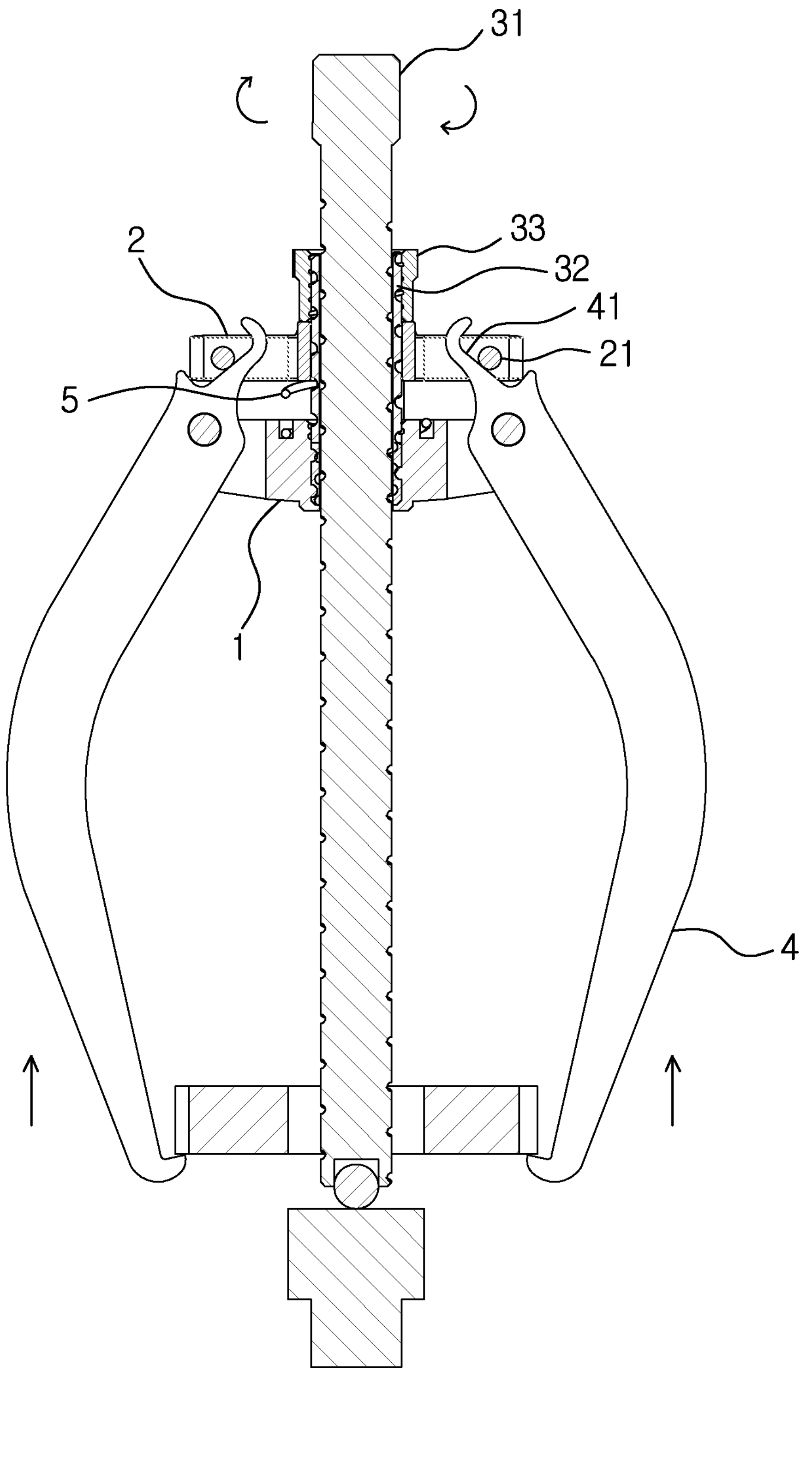
FIG. 7 is also another cross sectional view showing the operation of the puller structure according to the second embodiment of the present invention.

Thereby, the screw sleeve 33 is rotated to push the adjusting member 2, and then the adjusting member 2 presses the spring element 5 to move downwardly toward the holding disc 1, each coupling post 21 slides along the inclined guiding face 41 to push each pulling hook 4, such that each pulling hook 4 rotates relative to the holding disc 1 so as to expand outwardly (as shown in FIG. 5). In operation, the plurality of pulling hooks 4 are aligned with an object, and the screw sleeve 33 is rotated reversely so as to release a distance between the adjusting member 2 and the holding disc 1 so that the spring element 5 pushes the adjusting member 2 to move upwardly away from the holding disc 1, and the plurality of pulling hooks 4 retract inwardly to hook the object (as illustrated in FIG. 6), thereafter the inner screw rod 31 is rotated so that the plurality of pulling hooks 4 are driven to remove the object away (as shown in FIG. 7).

Furthermore, the holding disc 1 further includes a guide shaft 13 facing to the adjusting member 2, and the adjusting member 2 further includes a hole 22 for inserting the guide shaft 13, such that when the screw sleeve 33 is rotated to change the distance between the adjusting member 2 and the holding disc 1, the hole 22 cooperates with the guide shaft 13 so that the adjusting member 2 cause a vertical movement stably relative to the holding disc 1.

Figure 2:
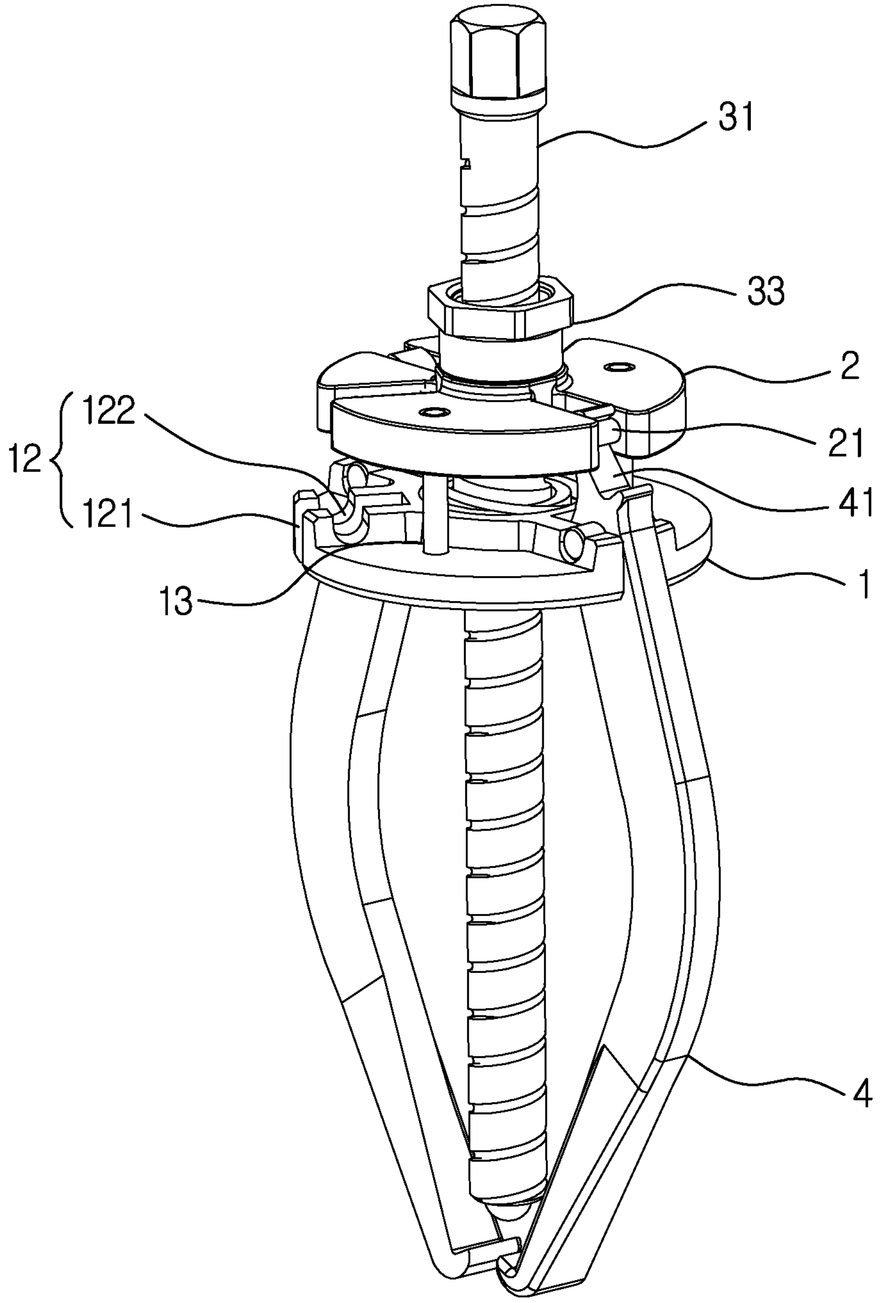
FIG. 2 is a perspective view showing the assembly of a puller structure according to a second embodiment of the present invention.
Figure 3:
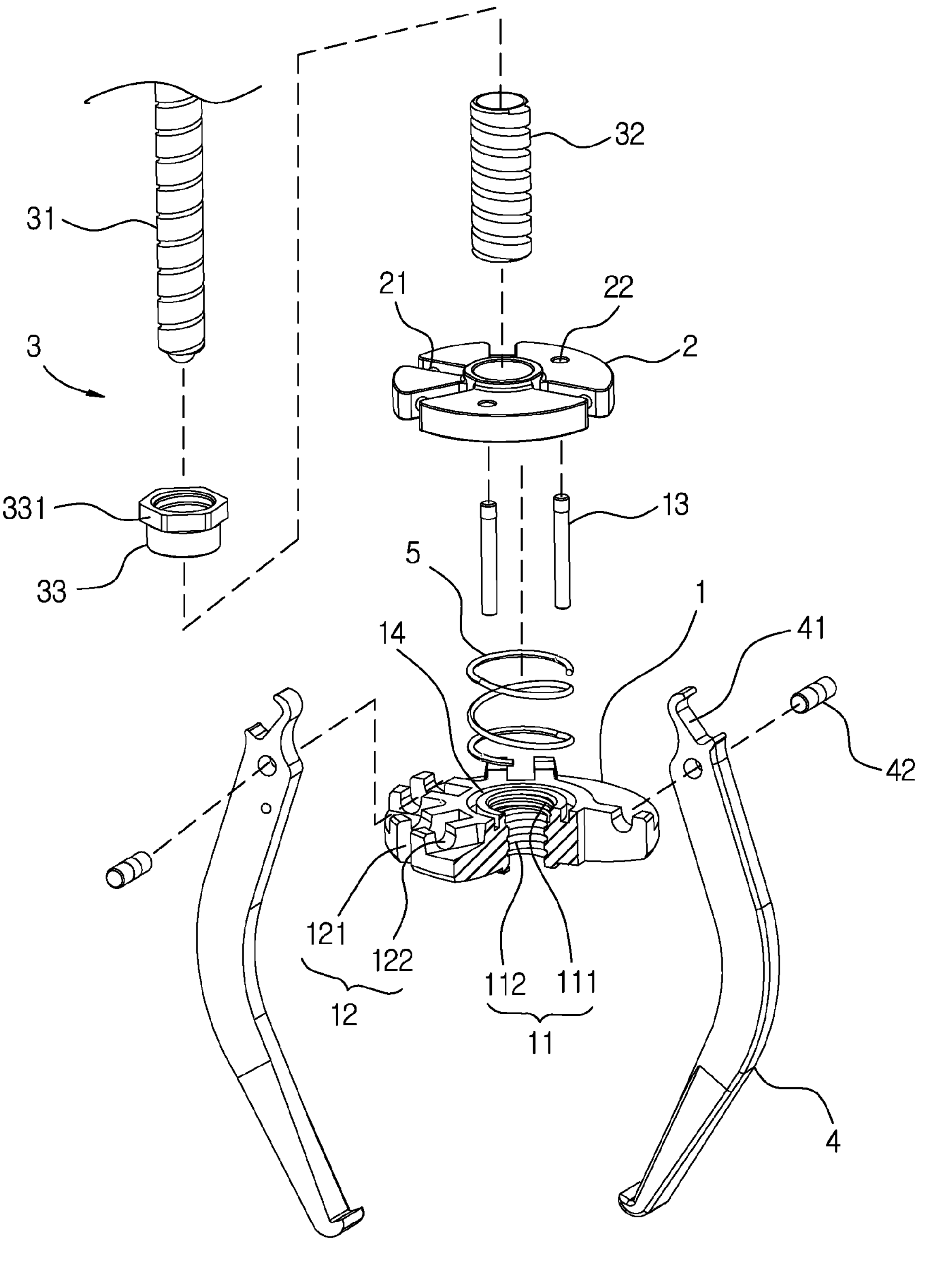
FIG. 3 is a perspective view showing the exploded components of the puller structure according to the second embodiment of the present invention.
Figure 4:
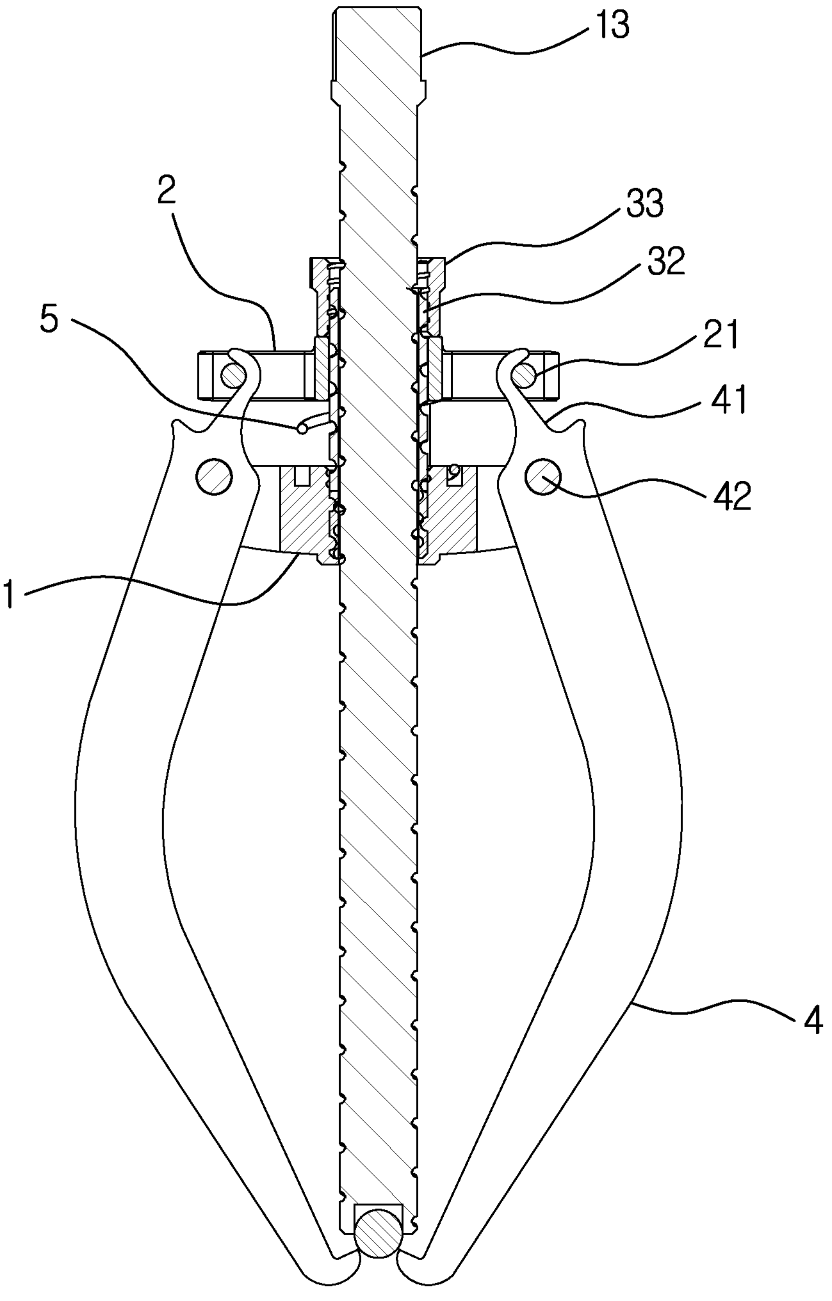
FIG. 4 is a cross sectional view showing the assembly of the puller structure according to the second embodiment of the present invention.

Preferably, each connecting portion 12 has a recess 121 defined between two side walls thereof and two hanging apertures 122 formed on the two side walls thereof so as to hang a stem 42 of a respective one of the plurality of pulling hooks 4, such that the plurality of pulling hooks 4 are fixed on and removed from the plural connecting portions 12. As shown in FIG. 1, a puller structure according to a first embodiment of the present invention comprises three pulling hooks 4; and the puller structure comprises two pulling hooks 4 as illustrated in FIG. 2.

The screw sleeve 33 has a polygonal section 331 arranged around an outer peripheral side thereof so that user drives a puller by ways of a hand tool, such as a wrench.

The holding disc 1 further includes a peripheral groove 14 defined around an outer peripheral side of the threaded orifice 11 of the holding disc 1 so as to accommodate the spring element 14, such that the spring element 5 abuts against the adjusting member 2 and the holding disc 1 securely.

Figure 8:
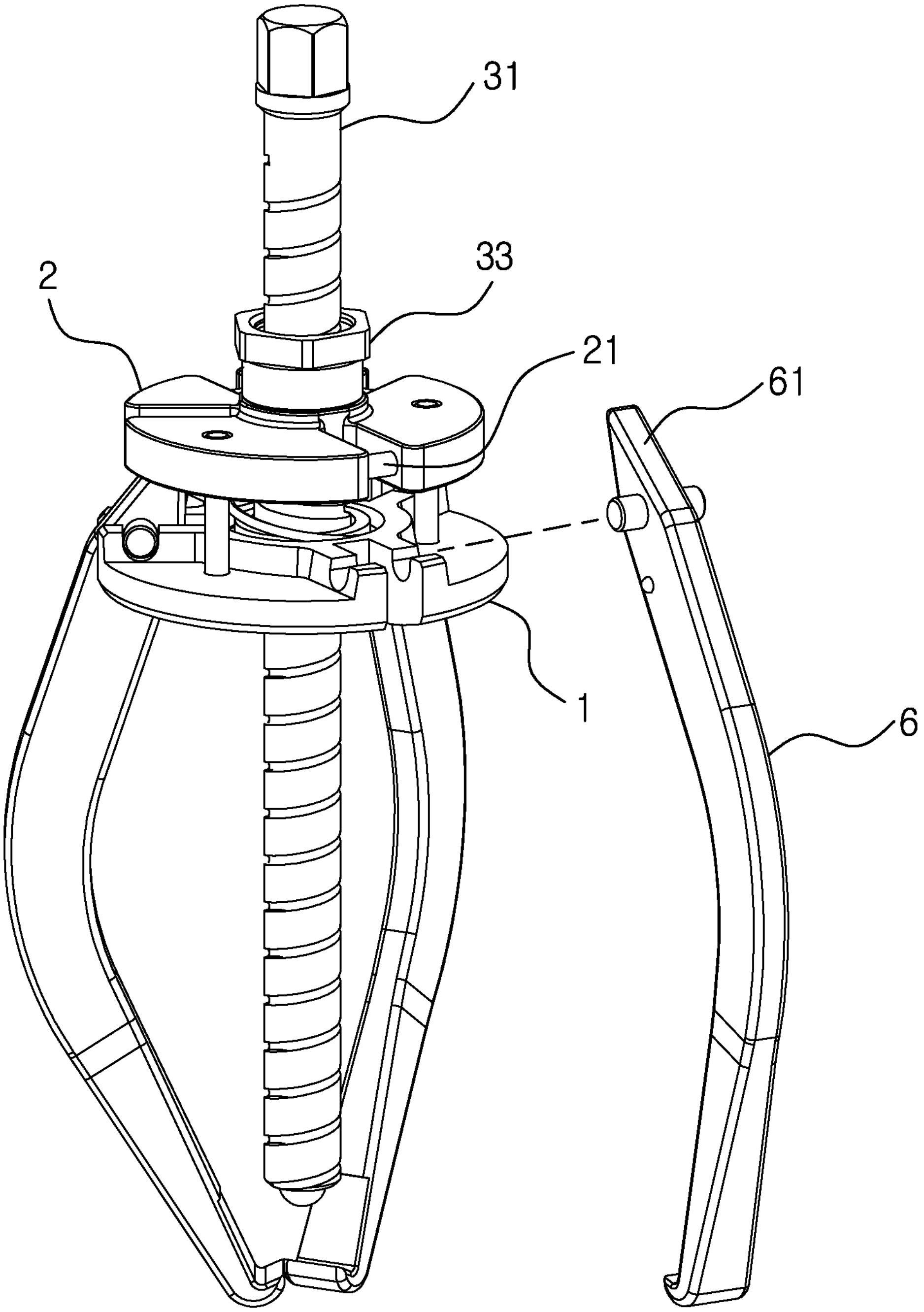
FIG. 8 is a perspective view showing the exploded components of a puller structure according to a third embodiment of the present invention.
Figure 9:
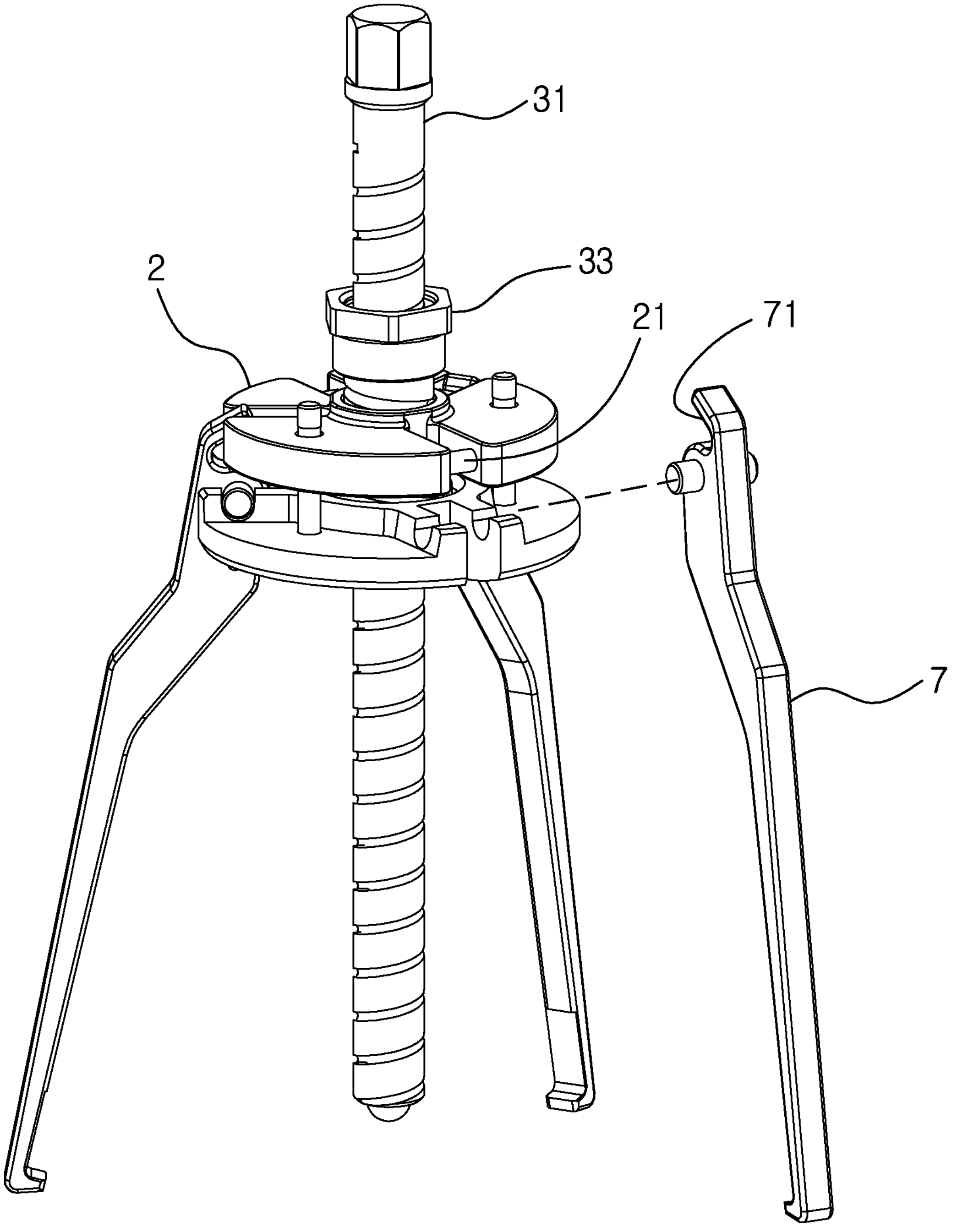
FIG. 9 is a perspective view showing the exploded components of a puller structure according to a fourth embodiment of the present invention.

With reference to FIGS. 8 and 9, the puller structure comprises a plurality of pulling hooks 6, 7 of various shapes. For example, each pulling hook 6 of FIG. 8 has an inclined guiding face 61, and the inclined guiding face 61 does not have two stopping ribs as those of the inclined guiding face 41 of FIG. 3. As shown in FIG. 9, the puller structure comprises three pulling hooks 7, and each pulling hook 7 has an inclined guiding face 71 corresponding to an upper rim of each coupling post 21, and when the adjusting member 2 moves upwardly, a plurality of pulling hooks 7 retract inwardly.

Accordingly, the distance between the adjusting member 2 and the holding disc 1 is adjusted so as to control the plurality of pulling hooks 4 to expand outwardly or retract inwardly, such that before removing the object, the plurality of pulling hooks 4 are aligned with the object accurately so as to remove the object quickly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A pulling structure comprising: a holding disc, an adjusting member, a screw rod set, and a plurality of pulling hooks;

the holding disc including a threaded orifice defined on a central position thereof so as to insert the screw rod set, and the threaded orifice having a wide screwing section formed around an upper side thereof and a narrow screwing section arranged around a lower side thereof, the holding disc also including plural connecting portions disposed on a peripheral side thereof so as to connect with the plurality of pulling hooks;

the screw rod set including an inner screw rod, an outer screw rod, and a hollow screw sleeve, wherein the inner screw rod is solid and is inserted through the narrow screwing section of the threaded orifice, and the outer screw rod is hollow and is fitted with an outer peripheral side of the inner screw rod, a bottom end of the outer screw is screwed with the wide screwing section, and the screw sleeve is screwed with the outer peripheral side of the outer screw rod;

the adjusting member fitted in the outer screw rod and defined between the screw sleeve and the holding disc, and a spring element abutting against the adjusting member and the holding disc; the adjusting member including a plurality of coupling posts mounted on a peripheral side thereof, and each pulling hook having an inclined guiding face defined on a top end thereof so as to fit each coupling post.

2. The pulling structure as claimed in claim 1, wherein the holding disc further includes a guide shaft facing to the adjusting member, and the adjusting member further includes a hole for inserting the guide shaft.

3. The pulling structure as claimed in claim 1, wherein each connecting portion has a recess defined between two side walls thereof and two hanging apertures formed on the two side walls thereof so as to hang a stem of a respective one of the plurality of pulling hooks.

4. The pulling structure as claimed in claim 1, wherein the screw sleeve has a polygonal section arranged around an outer peripheral side thereof.

5. The pulling structure as claimed in claim 1, wherein the holding disc further includes a peripheral groove defined around an outer peripheral side of the threaded orifice of the holding disc.

* * * * *